(12) United States Patent
Arai et al.

(10) Patent No.: US 8,353,982 B2
(45) Date of Patent: Jan. 15, 2013

(54) IMAGE FORMING METHOD

(75) Inventors: Yoshimitsu Arai, Kanagawa (JP);
Hiroaki Houjou, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 419 days.

(21) Appl. No.: 12/630,611

(22) Filed: Dec. 3, 2009

(65) Prior Publication Data

US 2010/0143592 A1    Jun. 10, 2010

(30) Foreign Application Priority Data

Dec. 10, 2008   (JP) .................................. 2008-314723

(51) Int. Cl.
*C09D 11/02* (2006.01)
(52) U.S. Cl. ...................................... 106/31.6
(58) Field of Classification Search .................. 106/31.6
See application file for complete search history.

(56) References Cited

U.S. PATENT DOCUMENTS

2005/0004263 A1*   1/2005  Gould et al. ................... 523/160

FOREIGN PATENT DOCUMENTS

| JP | 2004-67861 A | 3/2004 |
|---|---|---|
| JP | 2007-276482 A | 10/2007 |

* cited by examiner

*Primary Examiner* — Melvin C Mayes
*Assistant Examiner* — Veronica F Faison
(74) *Attorney, Agent, or Firm* — Birch, Stewart, Kolasch & Birch, LLP

(57) ABSTRACT

The invention provides an ink set having at least: a magenta ink containing at least a pigment; and a cyan ink containing at least a pigment. A ratio of M/C, in which M is the concentration of the pigment in the magenta ink, and C is the concentration of the pigment in the cyan ink, is 1.6 or more. A ratio of S2/S1, in which S2 is the solid content of an ink that has the largest solid content among the inks included in the ink set, and S1 is the solid content of an ink that has the smallest solid content among the inks included in the ink set, is 1.2 or less. The invention further provides an image forming method having applying the inks of the ink set onto a recording medium.

12 Claims, No Drawings

IMAGE FORMING METHOD

CROSS-REFERENCE TO RELATED APPLICATION

This application claims priority under 35 USC 119 from Japanese Patent Application No. 2008-314723 filed on Dec. 10, 2008, the disclosure of which is incorporated by reference herein.

BACKGROUND OF THE INVENTION

1. Field of Invention

The invention relates to an ink set and an image forming method.

2. Description of the Related Art

As a result of advances in inkjet recording techniques in recent years, inkjet recording methods have come to be used for formation of high-definition images that have previously been formed by applications such as photography and offset printing, and high-quality recording is in great demand.

An inkjet recording method has been disclosed in which the amount of a pigment ink composition ejected and the amount of a clear ink composition including a resin component ejected are adjusted in order to make the glossiness substantially even (see, for example, Japanese Patent Application Laid-Open (JP-A) No. 2007-276482).

An aqueous ink set for use in an inkjet has been disclosed in which pale inks and dark inks having different colorant concentrations include colored resin fine particles formed from colorants and resin and in which the respective light inks and dark inks have specific solid content ratios, in order to improve the sense of glossiness and resistance to color bleeding (see, for example, JP-A No. 2004-67861).

SUMMARY

The method of JP-A No. 2007-276482 makes the glossiness even by printing a larger amount of clear ink at portions in which a smaller amount of pigment ink is spotted. However, in a single-pass inkjet system device that enables high-speed printing, the ejection heads are expensive and it is necessary to provide separate ejection heads for the clear ink.

In JP-A No. 2004-67861, variations in glossiness between dark inks and light inks are reduced; however, the sense of glossiness is different to that of conventional printed matter.

In these circumstances, an excessive sense of glossiness compared to conventional printed matter is not preferable and there are a number of users demanding reductions in the extent to which glossiness is influenced by image density.

The present invention is made in view of the circumstances. The present invention is directed to an ink set and an image recording method capable of providing printed matter-like glossiness to printed images and achieving wide range of color reproducibility.

Namely, one aspect of the invention is an ink set comprising: a magenta ink comprising a pigment; and a cyan ink comprising a pigment, wherein: a ratio of M/C, in which M is the concentration of the pigment in the magenta ink, and C is the concentration of the pigment in the cyan ink, is 1.6 or more; and a ratio of S2/S1, in which S2 is the solid content of an ink that has the largest solid content among the inks included in the ink set, and S1 is the solid content of an ink that has the smallest solid content among the inks included in the ink set, is 1.2 or less.

Another aspect of the invention is an image forming method comprising: applying the inks of the ink set onto a recording medium; and applying, onto the recording medium, a treatment liquid comprising an aggregation accelerator that coagulates components of the inks.

Still another aspect of the invention is an image forming method comprising applying the inks of the ink set onto a recording medium, the recording medium comprising an aggregation accelerator that coagulates components of the inks.

DETAILED DESCRIPTION

The ink set of one aspect to the invention has at least a magenta ink containing at least a pigment and a cyan ink containing at least a pigment, and may further has one or more inks. Herein, the ink(s) may be also referred to as an "ink composition(s)". A ratio of M/C, in which "M" is the concentration of the pigment in the magenta ink, and "C" is the concentration of the pigment in the cyan ink, is 1.6 or more. A ratio of S2/S1, in which "S2" is the solid content of an ink that has the largest solid content among the inks included in the ink set, and "S1" is the solid content of an ink that has the smallest solid content among the inks included in the ink set, is 1.2 or less.

Herein, the ink of the ink set contains a pigment (colorant) and is free of a treatment liquid which contains an aggregation accelerator which coagulates components of the ink.

The use of the ink set may enable to provide printed matter-like glossiness to printed images and to achieve wide range of color reproducibility.

Magenta Ink and Cyan Ink

The ink set of one aspect to the invention has at least a magenta ink and a cyan ink. The ratio of M/C, in which "M" is the concentration of a pigment in the magenta ink, and "C" is the concentration of a pigment in the cyan ink, is 1.6 or more. The M/C is preferably from 1.6 to 2.5, and more preferably from 1.8 to 2.3, from the viewpoint of making the range of color reproducibility of printed images formed from the ink set wider.

Pigments in Magenta Ink and Cyan Ink

There is no particular limitation to a pigment contained in the magenta ink and/or the cyan ink included in the ink set, and the pigment may be appropriately selected in accordance with purposes.

The pigment may be either an organic pigment or an inorganic pigment, or both of these can be used in combination.

Examples of the organic pigment include azo pigments, polycyclic pigments, dye chelates, nitro pigments, nitroso pigments and aniline black. In particular, azo pigments and polycyclic pigments are preferable.

Examples of the azo pigments include an azo lake pigment, an insoluble azo pigment, a condensed azo pigment, and a chelate azo pigment.

Examples of the polycyclic pigments include a phthalocyanine pigment, a perylene pigment, a perynone pigment, an anthraquinone pigment, a quinacridone pigment, a dioxazine pigment, an indigo pigment, a thioindigo pigment, an isoindolinone pigment, and a quinofraron pigment.

Examples of the dye chelates include basic dye chelate pigments and acid dye chelate pigments.

Examples of the inorganic pigments include titanium oxide, iron oxide, calcium carbonate, barium sulfate, aluminum hydroxide, barium yellow, cadmium red, chrome yellow, and carbon black. Among these pigments, carbon black is particularly preferable. The carbon black may be, for example, a carbon black manufactured by a known method such as a contact method, a furnace method or a thermal method.

Examples of the organic pigment usable in the invention include magenta ink pigments such as C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (iron oxide red), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269 or C.I. pigment violet 19. Among these pigments, quinacridone pigments (such as C.I. Pigment Red 122, 202, 207, or 209 or C.I. Pigment Violet 19) are preferable, and C.I. Pigment Red 122, C.I. Pigment Red 207, C.I. Pigment Violet 19, and solid solutions formed from two or more among there are particularly preferable, from the viewpoints of improving dispersibility, ejectability and color hue of the ink.

The magenta ink may further contain an auxiliary yellow pigment and/or an auxiliary black pigment described below as necessary as long as effects of the invention is not affected thereby.

Examples of the organic pigment usable in the invention further include cyan ink pigments such as C.I. Pigment Blue 1, 2, 3, 15, 15:1, 15:2, 15:3, 15:34, 16, 17:1, 22, 25, 56, 60, C.I. Bat Blue 4, 60 or 63. Among these pigments, phthalocyanine pigments (such as C. I. Pigment Blue 15, 15:1, 15:3, 15:4, 16 or 17:1) are preferable, and C. I. Pigment Blue 15:3 and C. I. Pigment Blue 15:4 are particularly preferable, from the viewpoints of improving dispersibility, ejectability and color hue of the ink.

The cyan ink may further contain an auxiliary yellow pigment and/or an auxiliary black pigment described below as necessary as long as effects of the invention is not affected thereby.

Examples of the organic pigment usable in the invention further include yellow ink pigments such as C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155 or 180.

Examples of the organic pigment usable in the invention further include black ink pigments. Specific examples of a carbon black, which is a black pigment, include RAVEN 7000, RAVEN 5750, RAVEN 5250, RAVEN 5000 ULTRAII, RAVEN 3500, RAVEN 2000, RAVEN 1500, RAVEN 1250, RAVEN 1200, RAVEN 1190 ULTRAII, RAVEN 1170, RAVEN 1255, RAVEN 1080, RAVEN 1060 and RAVEN700 (trade names, manufactured by Columbian Chemicals Co.); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300 and MONARCH 1400 (trade names, manufactured by Cabot Corporation); COLOR BLACK FW1, COLOR BLACK FW2, COLOR BLACK FW2V, COLOR BLACK 18, COLOR BLACK FW200, COLOR BLACK S150, COLOR BLACK 5160, COLOR BLACK 5170, PRINTEX 35, PRINTEX U, PRINTEX V, PRINTEX 140U, PRINTEX 140V, SPECIAL BLACK 6, SPECIAL BLACK 5, SPECIAL BLACK 4A and SPECIAL BLACK 4 (trade names, manufactured by Degussa); and No. 25, No. 33, No. 40, No. 45, No. 47, No. 52, No. 900, No. 2200B, No. 2300, MCF-88, MA600, MA7, MA8 and MA100 (trade names, manufactured by Mitsubishi Chemical Corporation), although the black pigment employable in the invention is not limited thereto.

The pigment may be used singly or in combination of two or more thereof, each of which may be selected from the above classes of pigments and may belong to the same class as each other or different classes from each other.

Pigment Dispersant

The pigment, which is employed as a colorant in the ink composition, is preferably covered with a pigment dispersant and dispersed in water. When the pigment is employed in this condition, the pigment may be present as a very fine particulate and may be highly stably dispersed.

Herein, the surface of the pigment particle is not necessarily completely covered with the pigment dispersant, and may be covered at least one portion thereof.

Examples of the pigment used in the invention which are preferable from the viewpoint of the stability and ejection stability of the ink composition include water-dispersible pigment such as (1) an encapsulated pigment, (2) a self-dispersible pigment, (3) a resin dispersed pigment, or (4) a surfactant-dispersed pigment.

The encapsulated pigment (1) is a polymer emulsion formed by incorporating a pigment into polymer particles. More specifically, in the encapsulated pigment, pigment particles respectively have a resin layer formed of a hydrophilic water-insoluble resin which covers the surface of the pigment particle and imparts hydrophilicity to the pigment particle by its presence so that the pigment particles are dispersed in water. The encapsulated pigment can be formed by, for example, by phase inversion emulsification.

The self-dispersible pigment (2) is a pigment having at least one hydrophilic group on a surface thereof and exhibiting at least one of water-dispersibility or water-solubility in the absence of a dispersant. More specifically, the pigment is prepared by subjecting the surfaces of pigment particles (such as carbon black particles) to an oxidizing treatment so as to impart hydrophilicity to the pigment particles and so as to enable the pigment itself to disperse in water.

The resin dispersed pigment (3) is a pigment dispersed using a water-soluble polymer compound having a weight average molecular weight of 50,000 or less.

The surfactant-dispersed pigment (4) is a pigment dispersed using a surfactant.

Among these pigments, the encapsulated pigment (1) and the self-dispersible pigment (2) are preferable, and the encapsulated pigment (1) is particularly preferable.

Encapsulated Pigment

The resin used in the encapsulated pigment is not specifically limited, although it is preferably a polymer compound that is self-dispersible or dissolvable in a mixed solvent of water and a water-soluble organic solvent and that has an anionic (acidic) group. In general, the number average molecular weight of the resin is preferably in the range of about 1,000 to about 100,000, and particularly preferably in the range of about 3,000 to about 50,000. The resin is preferably a resin that can dissolve in an organic solvent to form a solution. When the number average molecular weight of a resin is within the above ranges, the resin can exhibit sufficient function as a cover layer on pigment particles or as a coated layer on an ink component in an ink composition. The resin is preferably used in the form of an alkali metal salt or an organic amine salt.

The resin used for the encapsulated pigment may be, for example, a material having an anionic group, and examples thereof include thermoplastic, thermosetting, or modified resins of the following types of resin: an acrylic resin, an epoxy resin, a polyurethane resin, a polyether resin, a polyamide resin, an unsaturated polyester resin, a phenol resin, a silicone resin, a fluoropolymer compound; a polyvinyl resin such as polyvinyl chloride, polyvinyl acetate, polyvinyl alcohol or polyvinyl butyral; a polyester resin such as an alkyd resin or a phthalic acid resin; an amino resin such as a melamine resin, a melamine-formaldehyde resin, an aminoalkid co-condensed resin, a urea formaldehyde resin, or a urea resin; and copolymers and mixtures of two or more of these resins.

Of the above resins, an anionic acrylic resin can be obtained, for example, by polymerizing, in a solvent, an acrylic monomer having an anionic group (hereinafter, referred to as an anionic group-containing acrylic monomer) and, optionally, one or more other monomers copolymerizable with the anionic group-containing acrylic monomer. Examples of the anionic group-containing acrylic monomer include an acrylic monomer having one or more anionic groups selected from the group consisting of a carboxylic group, a sulfonic acid group and a phosphoric group. Among these monomers, an acrylic monomer having a carboxyl group is preferable.

Examples of the acrylic monomer having a carboxyl group include acrylic acid, methacrylic acid, crotonic acid, ethacrylic acid, propylacrylic acid, isopropylacrylic acid, itaconic acid and fumaric acid. Among these monomers, acrylic acid and methacrylic acid are preferable.

An encapsulated pigment can be manufactured by a conventional physical and/or chemical method by using the above components. According to a preferable embodiment of the invention, the encapsulated pigment can be manufactured by the methods described in JP-A Nos. 9-151342, 10-140065, 11-209672, 11-172180, 10-25440, or 11-43636.

Specific examples of the method of forming the encapsulated pigment include the phase inversion emulsification method and the acid precipitation method shown in JP-A Nos. 9-151342 and 10-14006, and among these, the phase-inversion emulsification method is preferable in view of dispersion stability. Details of the phase-inversion emulsification method and the acid precipitation method are explained below.

A self-dispersible pigment is a pigment in which a number of hydrophilic functional groups and/or a salt thereof (hereinafter, referred to as a dispersibility-imparting group) are directly or indirectly (via an alkyl group, an alkyl ether group, an aryl group or the like) bonded to the surfaces of particles of the pigment, so that the pigment particles can be dispersed in an aqueous medium without a dispersant. Here, the expression "can be dispersed in an aqueous medium without a dispersant", indicates a state in which the pigment particles are dispersible in the aqueous medium even when a dispersant for dispersing the pigment is not used.

An ink composition containing a self-dispersible pigment as a colorant does not need to contain a dispersant, which is otherwise contained for dispersing a usual pigment. Therefore, the ink containing a self-dispersible pigment can be free from decrease in defoaming property due to a dispersant, and generation of foam is hardly observed in the ink composition containing a self-dispersible pigment. Accordingly, an ink composition with excellent ink ejection stability can be easily prepared by employing a self-dispersible pigment.

The pigment in the invention is preferably an encapsulated pigment, at least a part of the surface of which is covered with a water-insoluble resin used as a pigment dispersant. Examples thereof include a polymer emulsion of a pigment contained in water-insoluble resin particles, which is more preferably a pigment having a surface, at least a part of which is covered with a water-insoluble resin to form a resin layer on the surface so as to make the pigment be dispersible in water.

Details of the phase-inversion emulsification method and the acid precipitation method are explained below.

a) Phase-Inversion Emulsification Method

The phase-inversion method is a self-dispersing method, which may basically include dispersing a mixture of a pigment and a water-soluble or self-dispersing resin in water, in which the "mixture" refers to a state in which the components in an undissolved state are mixed, or a state in which the components are dissolved and mixed, or a state including both of the above states, and may contain the curing agent or the polymer compound. Specific examples of the phase-inversion method include that described in JP-A No. 10-140065.

b) Acid Precipitation Method

The acid precipitation method is a method which includes preparing a water-containing cake containing a resin and a pigment, and neutralizing a part or all of anionic groups of the resin in the water-containing cake with a basic compound to produce an encapsulated pigment.

Specifically, the acid precipitation method includes (1) dispersing a resin and a pigment in an alkaline aqueous medium, and may further heat-treating the resultant if necessary, to produce a gel of the resin, (2) neutralizing or acidifying the system to hydrophobize the resin so as to firmly adhere the resin to a pigment, (3) performing filtration and water washing as necessary to yield a water-containing cake, (4) neutralizing, with a basic compound, a part or the all of anionic groups of the resin in the water-containing cake, and then re-dispersing the resin in an aqueous medium, and (5) performing heating as necessary to produce a gel of the resin.

More specific methods of the phase-inversion emulsification and the acid precipitation method are shown in JP-A Nos. 9-151342 and 10-14006.

In the invention, the content of the pigment is preferably from 0.1 weight % to 15 weight %, more preferably from 0.5 weight % to 12 weight %, and particularly preferably from 1 weight % to 10 weight %, with respect to the total amount of the ink composition, in consideration of coloring properties, graininess, ink stability and ink ejection reliability. The pigment may be used singly or in combination of two or more kinds of those selected from one or more groups of the pigments (1) to (4) and the like.

Pigment Dispersant

The pigment dispersant may facilitate dispersing of the pigment or stabilizing of the dispersed state of the pigment in a pigment dispersion. The pigment dispersant can be selected appropriately from those compounds having a function of dispersing a pigment in an aqueous phase. Examples of the pigment dispersant include nonionic compounds, anionic compounds, cationic compounds and amphoteric compounds.

Examples of the pigment dispersant include a homopolymer or a copolymer formed from monomers having an $\alpha,\beta$-ethylenic unsaturated group. Examples of the monomers having an $\alpha,\beta$-ethylenic unsaturated group include ethylene, propylene, butene, pentene, hexene, vinyl acetate, allyl acetate, acrylic acid, methacrylic acid, crotonic acid, a crotonic acid ester, itaconic acid, an itaconic acid monoester, maleic acid, a maleic acid monoester, a maleic acid diester, fumaric acid, a fumaric acid monoester, vinyl sulfonic acid, styrene sulfonic acid, sulfonated vinyl naphthalene, vinyl alcohol, acrylamide, methacryloxy ethyl phosphate, bis-methacryloxyethyl phosphate, methacryloxyethylphenyl acid phosphate, ethyleneglycol dimethacrylate, diethyleneglycol dimethacrylate, styrene, styrene compounds such as $\alpha$-methyl styrene or vinyltoluene; vinyl cyclohexane, vinyl naphthalene, vinyl naphthalene compounds, an alkyl acrylate which may have an aromatic substituent, phenyl acrylate, an alkyl methacrylate which may have an aromatic substituent, phenyl methacrylate, a cycloalkyl methacrylate, an alkyl crotonate, a dialkyl itaconate, a dialkyl maleate, vinyl alcohol, and modified compounds of the above compounds.

A homopolymer formed by polymerization of one kind of monomer having an α,β-ethylenic unsaturated group, which may be selected from the above monomers, or a copolymer formed by copolymerization of plural kinds of monomer having an α,β-ethylenic unsaturated group, each of which may be selected from the above monomers, may be used as a polymer dispersant. Examples of the polymer dispersant include an alkyl acrylate-acrylic acid copolymer, an alkyl methacrylate-methacrylic acid copolymer, a styrene-alkyl acrylate-acrylic acid copolymer, styrene-phenyl methacrylate-methacrylic acid copolymer, a styrene-cyclohexyl methacrylate-methacrylic acid copolymer, a styrene-styrene sulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, polystyrene, a polyester, and polyvinyl alcohol.

From viewpoints of improving its absorbability to a pigment surface and dispersion stability imparting property, the pigment dispersant is preferably a water-insoluble resin, and more preferably a water-insoluble resin having a hydrophilic structural unit (a) and a hydrophobic structural unit (b). The water-insoluble resin may further have another structural unit which is different from the hydrophilic structural unit (a) and the hydrophobic structural unit (b) in accordance with necessity.

Hydrophilic Structural Unit (a)

There is no limitation on the hydrophilic structural unit insofar as it is derived from a hydrophilic group-containing monomer, and may be derived from one hydrophilic group-containing monomer or may be derived from two or more hydrophilic group-containing monomers. The hydrophilic group is not limited and may be a dissociative group or a nonionic hydrophilic group.

The "structural unit (of a polymer) derived from a (specific) monomer" herein means a unit that has a structure which can be typically incorporated into the polymer by employing the (specific) monomer as that to be polymerized for forming the polymer.

The dissociative group and/or a nonionic hydrophilic group may be incorporated into the water-insoluble resin by forming the water-insoluble resin using a monomer having a dissociative group and/or a monomer having a nonionic hydrophilic group.

The dissociative group may be preferable from the viewpoints of stabilizing of the emulsion state or the dispersed state of the pigment in a pigment dispersion. Examples of the dissociative group include a carboxyl group, a phosphonic acid group, and a sulfonic acid group. Among the above, the carboxyl group is preferable from the viewpoint of the dispersion stabilizing property when the ink composition is formed therewith.

The hydrophilic group-containing monomer is preferably a dissociative group-containing monomer, and specifically, the hydrophilic group-containing monomer is preferably a dissociative group-containing monomer having a dissociative group and an ethylenically unsaturated bond. Examples of the dissociative group-containing monomer include an unsaturated carboxylic acid monomer, an unsaturated sulfonic acid monomer, and an unsaturated phosphonic acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl(meth)acrylate, and bis-(3-sulfopropyl)-itaconate. Specific examples of the unsaturated phosphate monomer include vinyl phosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, the unsaturated carboxylic acid monomer is preferable, and acrylic acid and methacrylic acid are more preferable, from the viewpoint of dispersion stability and jetting stability.

Examples of the hydrophilic structural unit (a) further include a structural unit derived from a monomer having a nonionic hydrophilic group. The monomer having a nonionic hydrophilic group is not particularly limited as long as it has both a nonionic hydrophilic functional group and a functional group (for example, an ethylenically unsaturated bond) that can form a polymer, and may be selected from monomers known in the art. Vinyl monomers are preferable from the viewpoint of availability, handleability and general versatility.

Examples of the hydrophilic structural unit (a) include hydrophilic functional group-containing vinyl monomers such as hydrophilic functional group-containing (meth)acrylates, hydrophilic functional group-containing (meth)acrylamides, or hydrophilic functional group-containing vinyl esters.

Examples of the "hydrophilic functional group" as used herein includes a hydroxyl group, an amino group, an amide group (in which nitrogen atom is unsubstituted), and alkylene oxides such as polyethylene oxide or polypropylene oxide described below.

Preferable examples of the hydrophilic structural unit (a) include hydroxyethyl (meth)acrylate, hydroxybutyl (meth)acrylate, (meth)acrylamide, aminoethyl acrylate, aminopropyl acrylate, and alkylene oxide polymer-containing (meth)acrylates.

The hydrophilic structural unit having a nonionic hydrophilic group may be incorporated into the water-insoluble resin by forming a polymer chain of the water-insoluble resin by polymerizing monomers corresponding to the hydrophilic structural unit. Alternatively, the hydrophilic structural unit having a nonionic hydrophilic group may be provided in the water-insoluble resin by introducing a hydrophilic functional group into a polymer chain of the water-insoluble resin which has been formed by polymerization.

The hydrophilic structural unit having a nonionic hydrophilic group is more preferably a hydrophilic structural unit having an alkylene oxide structure. From the viewpoint of hydrophilicity, the alkylene moiety of the alkylene oxide structure preferably has 1 to 6 carbon atoms, more preferably has 2 to 6 carbon atoms, and still more preferably has 2 to 4 carbon atoms. The degree of polymerization of the alkylene oxide structure is preferably 1 to 120, more preferably 1 to 60, and still more preferably 1 to 30.

In one preferable embodiment, the hydrophilic structural unit having a nonionic hydrophilic group is a hydroxyl group-containing hydrophilic functional unit. The number of a hydroxyl group(s) in the structural unit, although being not particularly limited, is preferably 1 to 4, more preferably 1 to 3, and still more preferably 1 to 2, from the viewpoint of the hydrophilicity of the water-insoluble resin and compatibility with a solvent and other monomers at the time of polymerization.

The content ratio of the hydrophilic structural unit may vary depending on the content ratio of the hydrophobic structural unit (b) and/or the like. For example, when the water-insoluble resin is composed exclusively of acrylic acid and/or methacrylic acid (hydrophilic structural unit (a)) and the hydrophobic structural unit (b), the content ratio of acrylic acid and/or methacrylic acid may be determined by "100−(the hydrophobic structural unit) (weight %)".

The hydrophilic structural units (a) may be used singly or as a mixture of two or more thereof.

The content ratio of the hydrophilic structural unit (a) is preferably in the range of 0% by weight to 15% by weight, more preferably in the range of 2% by weight to 15% by weight, still more preferably in the range of 5% by weight to 15% by weight, and further more preferably in the range of 8% by weight to 12% by weight, with respect to the total amount of the water-insoluble resin.

Hydrophobic Structural Unit (b)

Examples of the hydrophobic structural unit (b) include a hydrophobic structural unit which has an aromatic ring which is linked to, through a linking group, an atom which configures a main chain structure of the water-insoluble resin.

The hydrophobic structural unit having the aromatic ring maintains an adequate distance between the aromatic ring, which is hydrophobic, and a hydrophilic structural unit in the water-insoluble resin because the aromatic ring is not directly linked to an atom which configures a main chain structure of the water-insoluble resin. Therefore, an interaction between the water-insoluble resin and the pigment can easily occur, whereby the water-insoluble resin can be firmly adsorbed to the pigment, so that the dispersibility of the pigment can be improved.

Among the hydrophobic structural unit (a) which has an aromatic ring which is linked to, through a linking group, an atom which configures a main chain structure of the water-insoluble resin, examples of the hydrophobic structural unit (a) which is preferable from the viewpoint of facilitating easy granulation of the pigment include a structural unit represented by the following Formula (1).

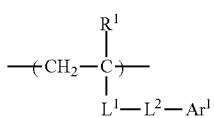

Formula (1)

In Formula (1), $R^1$ represents a hydrogen atom, a methyl group or a halogen atom; $L^1$ represents *—COO—, *—OCO—, *—CONR²—, *—O—, or a substituted or unsubstituted phenylene group wherein the side designated by "*" in each structure corresponds to the side linked to the main chain of the water-insoluble resin; and $R^2$ represents a hydrogen atom or an alkyl group having 1 to 10 carbon atoms. Here, examples of the substituent include, but are not limited to, a halogen atom, an alkyl group, an alkoxy group, a hydroxyl group, and a cyano group.

$L^2$ represents a single bond or a divalent linking group having 1 to 30 carbon atoms. If $L^2$ represents a divalent linking group, the linking group preferably has 1 to 25 carbon atoms, and more preferably has 1 to 20 carbon atoms. Particularly preferably, $L^2$ represents an alkyleneoxy group having 1 to 25 carbon atoms (more preferably 1 to 10 carbon atoms), an imino group (—NH—), a sulfamoyl group, a divalent linking group containing an alkylene group such as an alkylene group having 1 to 20 carbon atoms (more preferably 1 to 15 carbon atoms) or ethyleneoxide group (—(CH₂CH₂O)$_n$—, in which n is an integer of from 1 to 6), and a group containing two or more of these in combination.

$Ar^1$ represents a monovalent group having an aromatic ring. The aromatic ring of $Ar^1$ is not particularly limited, and examples thereof include a benzene ring, a condensed aromatic ring having 8 or more carbon atoms, a heterocyclic ring condensed with an aromatic ring(s), and connected benzene rings in which two or more benzene rings are connected.

In preferable embodiments, in Formula (1), $R^1$ represents a hydrogen atom or a methyl group, $L^1$ represents *—COO—, and $L^2$ represents a divalent linking group having 1 to 25 carbon atoms and containing an alkyleneoxy group and/or an alkylene group. In more preferable embodiments, in Formula (1), $R^1$ represents a hydrogen atom or a methyl group, $L^1$ represents *—COO—, and $L^2$ represents —(CH₂—CH₂—O)$_n$— (where n represents an average of numbers of repeating units and is from 1 to 6).

The condensed aromatic ring having 8 or more carbon atoms is an aromatic compound having 8 or more carbon atoms and containing: an aromatic ring formed by condensation of two or more benzene rings; and/or a ring formed by at least one aromatic ring and at least one alicyclic hydrocarbon condensed with the aromatic ring. Specific examples thereof include naphthalene, anthracene, fluorene, phenanthrene, and acenaphthene.

The heterocyclic ring condensed with an aromatic ring(s) is a compound containing a condensed ring in which at least one aromatic compound (preferably a benzene ring) containing no hetero atom and at least one cyclic compound containing a hetero atom are condensed with each other. Here, the cyclic compound containing a hetero atom is preferably a 5-membered ring or a 6-membered ring. Preferable examples of the hetero atom include a nitrogen atom, an oxygen atom, and a sulfur atom. The cyclic compound containing a hetero atom may contain plural hetero atoms, and in this case, the hetero atoms may be the same or different from each other. Specific examples of the heterocyclic ring condensed with an aromatic ring(s) include phthalimide, acridone, carbazole, benzoxazole, and benzothiazole.

Specific examples of a monomer that can form the structural unit represented by Formula (1) are shown below, although the invention is not restricted to the following examples.

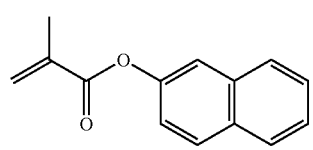

M-1

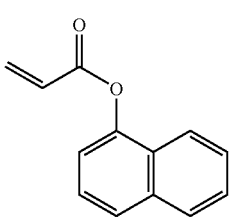

M-2

-continued
M-3
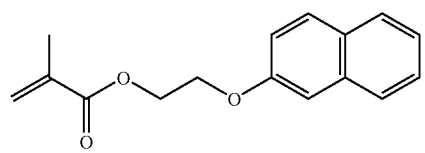
M-4
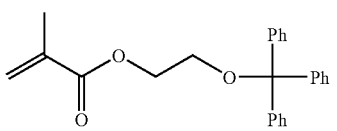
M-5
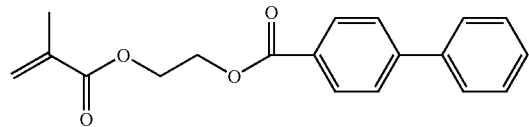
M-6
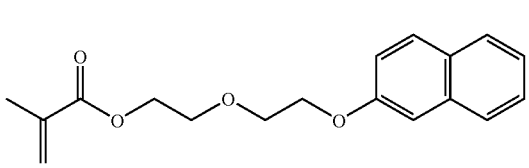
M-7
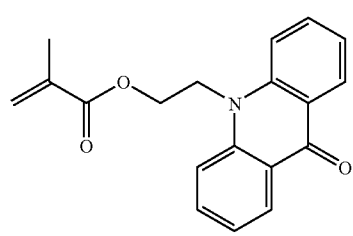
M-8
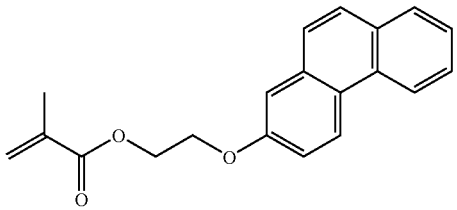
M-9
M-10
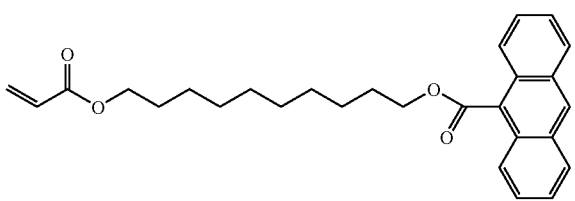
M-11
M-12
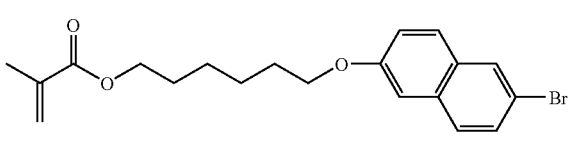
M-13
M-14
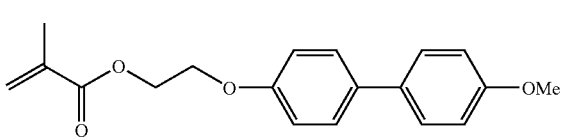
M-15
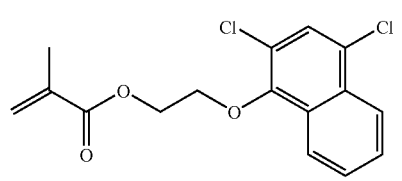
M-16
M-17
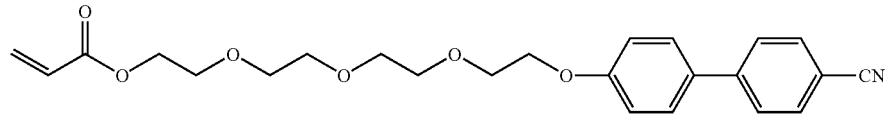

-continued

M-18
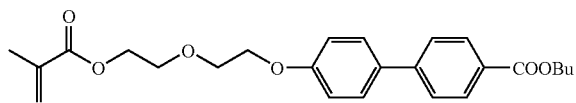

M-19
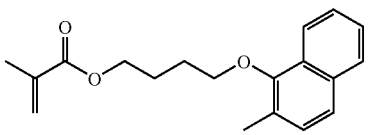

M-20
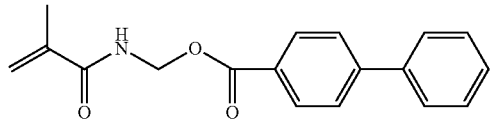

M-21
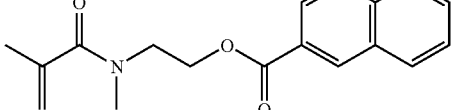

M-22
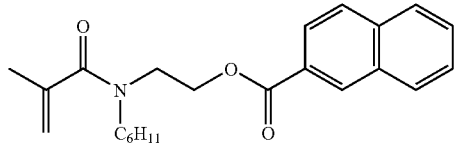

M-23
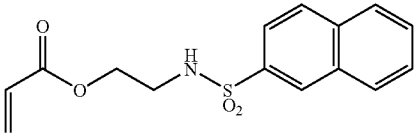

M-24
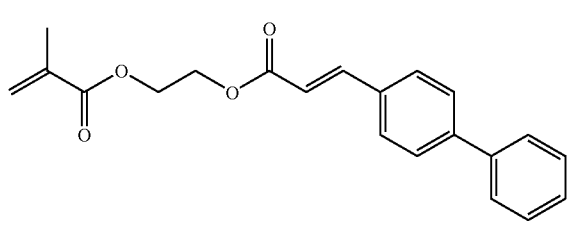

M-25
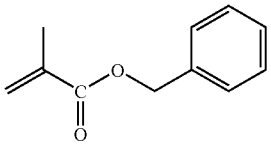

M-26
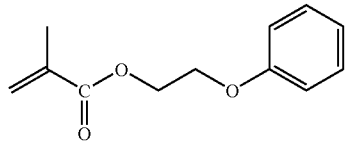

M-27
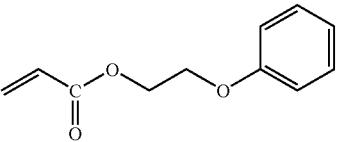

Among the structural units represented by Formula (1), structural unit derived from benzyl methacrylate, phenoxyethyl acrylate or phenoxyethyl methacrylate may be preferable in consideration of the dispersion stability. In preferable embodiments, the water-insoluble resin contains one or more of the structural units selected from these as the hydrophobic structural unit (b).

The content of the hydrophobic structural unit having an aromatic ring which is linked to, through a linking group, an atom which configures the main chain of the water-insoluble resin is preferably 40 weight % or more, more preferably from 40 weight % to less than 75 weight %, still more preferably from 40 weight % to less than 70 weight %, and particularly preferably from 40 weight % to less than 60 weight %, with respect to the total amount of the water-insoluble resin, in consideration of dispersion stability of the pigment and ejection stability and cleanability of the ink composition.

The content of the aromatic ring which is linked to, through a linking group, an atom which configures the main chain of the water-insoluble resin is preferably from 15 weight % to 27 weight %, more preferably from 15 weight % to 25 weight %, and particularly preferably from 15 weight % to 20 weight %, with respect to the total amount of the water-insoluble resin, from the viewpoint of improving rubbing resistance. When the content of the aromatic ring is in the above ranges, rubbing resistance, ink stability and ink ejection reliability may be enhanced.

From the viewpoint of dispersion stability, the water-insoluble resin employed in the invention preferably has a structural unit derived from an alkyl (meth)acrylate having 1 to 4 carbon atoms in its alkyl group (a (meth)acrylic acid ester of an alkyl having 1 to 4 carbon atoms). The scope of "(meth) acrylic acid" include acrylic acid and methacrylic acid, and the scope of "(meth)acryate" include acrylate and methacrylate.

Specific examples of the alkyl (meth)acrylate include methyl (meth)acrylate, ethyl (meth)acrylate, (iso)propyl (meth)acrylate, and (iso- or tertiary-) butyl (meth)acrylate. The number of carbon atoms in the alkyl moiety of the alkyl ester is in the range of from 1 to 4, and is preferably 1 or 2.

From the viewpoint of dispersion stability, the content ratio of the "structural unit derived from an alkyl (meth)acrylate having 1 to 4 carbon atoms" in the water-insoluble resin is preferably 15% by weight or more with respect to the total amount of the water-insoluble resin. The content ratio of this structural unit is preferably 20% by weight to 60% by weight, more preferably 20% by weight to 50% by weight.

Examples of the hydrophobic structural unit (b) other than those described above include structural units which do not belong to the hydrophilic structural unit (a) (for example, structural units which do not have a hydrophilic functional group) and which are derived from vinyl monomers such as (meth)acrylamides, styrenes or vinyl esters, and (meth)acrylates such as alkyl esters (number of carbon atoms: 1 to 4) of methacrylates. These structural units may be used singly or as a mixture of two or more thereof.

Examples of the (meth)acrylamides include N-cyclohexyl (meth)acrylamide, N-(2-methoxyethyl) (meth)acrylamide, N,N-diallyl (meth)acrylamide and N-allyl (meth)acrylamide.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, and chloromethylstyrene; hydroxystyrene protected by a group (for example, t-Boc) that can be deprotected by an acidic material; methyl vinylbenzoate, α-methylstyrene, and vinyl naphthalene. Among them, styrene and α-methylstyrene are preferable.

Examples of the vinyl esters include vinyl acetate, vinyl chloroacetate, vinyl propionate, vinyl butyrate, vinyl methoxyacetate, and vinyl benzoate. Among them, vinyl acetate is preferable.

Examples of the (meth)acrylates include methyl (meth) acrylate, ethyl (meth)acrylate, (iso)propyl (meth)acrylate, and (iso- or tertiary-) butyl (meth)acrylate.

The content of the hydrophobic structural unit (b) in the composition of the water-insoluble resin, although varying depending on the degrees of the hydrophilicity and hydrophobicity of the hydrophilic structural unit (a) and the hydrophobic structural unit (B), is preferably higher than 80% by weight, more preferably higher than 85% by weight, with respect to the total amount of the water-insoluble resin. In other words, the content of the hydrophilic structural unit (a) is preferably in the range of 15% by weight or less, with respect to the total amount of the water-insoluble rein. When the content of the hydrophilic structural unit (a) is 15% by weight or less, the component which is dissolved by itself in an aqueous medium without contributing to dispersion of the pigment is reduced. Therefore, the dispersed state of the pigment can be kept excellent, and the viscosity can be suppressed from increasing, and thus the water-insoluble resin when used in an ink for inkjet recording can improve jetting performance.

The water-insoluble resin employed in the invention may be a random copolymer in which the respective structural units are randomly introduced or a block copolymer in which the respective structural units are regularly introduced. When the water-insoluble resin is a block copolymer, the order of introducing the respective structural units during the synthesis of the block polymer is not limited; further, the same structural unit may be used two or more times during the synthesis of the block copolymer. The water-insoluble resin is preferably a random copolymer in consideration of the versatility and manufacturability.

The acid value of the pigment dispersant (specifically the water-insoluble resin) of the invention is preferably from 30 mg KOH/g to 100 mg KOH/g, more preferably 30 mg KOH/g or more and less than 85 mg KOH/g, and particularly preferably 50 mg KOH/g or more and less than 85 mg KOH/g, in consideration of the pigment dispersibility and storage stability.

Here, the acid value is defined as the weight (mg) of KOH required for completely neutralizing 1 g of the water-insoluble resin, and can be measured in accordance with the method described in JIS Standard (JIS-K0070 (1992); the disclosure of which is incorporated by reference herein), which corresponds to ASTM D974.

The molecular weight of the water-insoluble resin used in the invention is, in terms of a weight average molecular weight (Mw), preferably from 30,000 to 150,000, more preferably from 30,000 to 100,000, and still more preferably from 30,000 to 80,000.

When the water-insoluble resin has a molecular weight which is 30,000 or more, steric repulsion effect that the water-insoluble resin can exerts as a dispersant may improve and the time it takes for the water-insoluble resin to adsorb to the pigment may be shortened due to steric effect.

The number-average molecular weight (Mn) of the water-insoluble resin employed in the invention is preferably in the range of about 1,000 to about 100,000, more preferably in the range of about 3,000 to about 50,000. When the number-average molecular weight is in the range defined above, the water-insoluble resin may function as a coating film on the pigment or function as a coating film of the ink. The water-insoluble resin employed in the invention is used preferably in the form of an alkali metal salt or an organic amine salt.

The molecular weight distribution (weight average molecular weight/number average molecular weight) of the water-insoluble resin used in the invention is preferably from 1 to 6, and more preferably from 1 to 4. It is preferable that the molecular weight distribution is set within the above ranges in consideration of the dispersion stability and ejection stability of the ink composition.

Each of the number average molecular weight and the weight average molecular weight used herein is a molecular weight value obtained by measuring a molecular weight with a GPC analyzer using columns of TSKgel GMHxL, TSKgel G4000HxL and TSKgel G2000HxL (trade names, manufactured by Tosoh Corporation) and then converting the measured value using polystyrene as a reference material; the solvent used for GPC is THF and the detection is conducted by a differential refractometer.

The water-insoluble resin used in the invention can be synthesized using various polymerization methods, such as a solution polymerization, a precipitation polymerization, a suspension polymerization, a bulk polymerization, or an emulsion polymerization. The polymerization reaction can be performed by known operations such as a batch system, a semi-continuous system or a continuous system.

Examples of the method of polymerization initiation include a method using a radical initiator and a method including photo-irradiation or radiation. These polymerization methods and the polymerization initiation methods are described, for example, in Teiji Tsuruta, "Kobunshi Gousei Houhou" (Polymer Synthesis Method), revised edition (Nikkan Kogyo Shimbun (1971)) and Takayuki Otsu and Masayoshi Kinoshita, "Koubunshi Gousei-no Jikken-ho" (Experimental Method of Polymer Synthesis), (Kagaku-Dojin (1972)), pp. 124-154.

Specifically, the water-insoluble resin may be produced by subjecting a mixture which contains monomers and may further contain an organic solvent and a radical polymerization initiator in accordance with necessity to copolymerization under inert gas atmosphere. Among the polymerization methods, the solution polymerization method using a radical initiator is particularly preferable. Examples of the solvent used in the solution polymerization method include ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These organic solvents may be used singly, or may be used in the form of a mixture of two or more kinds thereof, or may be mixed with water and used as a mixed solvent.

The polymerization temperature should be set in consideration of, for example, the molecular weight of the polymer to be formed and the kind of the initiator. In general, the polymerization temperature is from about 0° C. to about 100° C. It is preferable to perform polymerization at a temperature of from 50° C. to 100° C.

The reaction pressure can be suitably selected, and is usually from about 1 kg/cm² to about 100 kg/cm², and is preferably from about 1 kg/cm² to about 30 kg/cm². The reaction time may be from about 5 hours to about 30 hours. The obtained resin may be purified by reprecipitation or the like.

Preferable examples of the water-insoluble resin of the invention are shown below, while the invention is not limited thereto. Herein, a, b, c, d, e, f, g, h, and i each represent a ratio of the respective unit in terms of weight % with respect to the total amount of the exemplified water-insoluble resin.

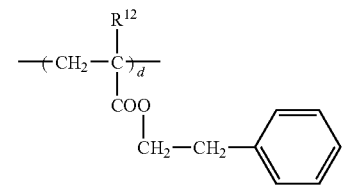

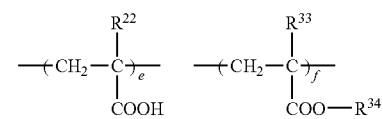

| | $R^{12}$ | $R^{22}$ | $R^{33}$ | $R^{34}$ | d | e | f | Mw |
|---|---|---|---|---|---|---|---|---|
| B-8 | CH₃ | CH₃ | CH₃ | —CH₃ | 55 | 12 | 33 | 31000 |
| B-9 | H | H | H | —CH₂CH(CH₃)₂ | 70 | 10 | 20 | 34600 |

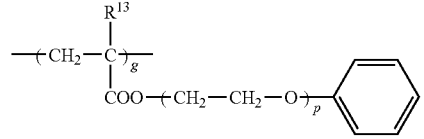

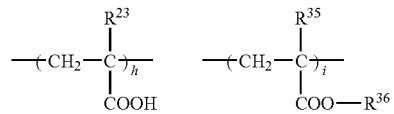

| | $R^{13}$ | p | $R^{23}$ | $R^{35}$ | $R^{36}$ | g | h | i | Mw |
|---|---|---|---|---|---|---|---|---|---|
| B-10 | CH₃ | 1 | CH₃ | CH₃ | —CH₃ | 60 | 9 | 31 | 35500 |
| B-11 | H | 1 | H | H | —CH₂CH₃ | 69 | 10 | 21 | 41200 |
| B-12 | CH₃ | 2 | CH₃ | CH₃ | —CH₃ | 70 | 11 | 19 | 68000 |
| B-13 | CH₃ | 4 | CH₃ | CH₃ | —CH(CH₃)₂ | 70 | 7 | 23 | 72000 |
| B-14 | H | 5 | H | H | —CH₃ | 70 | 10 | 20 | 86000 |
| B-15 | H | 5 | H | H | —CH₂CH(CH₃)₂ | 70 | 2 | 28 | 42000 |

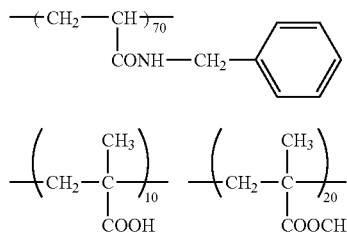

| | $R^{11}$ | $R^{21}$ | $R^{31}$ | $R^{32}$ | a | b | c | Mw |
|---|---|---|---|---|---|---|---|---|
| B-1 | CH₃ | CH₃ | CH₃ | —CH₃ | 60 | 10 | 30 | 46000 |
| B-2 | H | H | H | —CH₃ | 60 | 10 | 30 | 50000 |
| B-3 | CH₃ | CH₃ | CH₃ | —CH₂CH₃ | 61 | 10 | 29 | 43000 |
| B-4 | CH₃ | CH₃ | CH₃ | —CH₂CH₂CH₂CH₃ | 61 | 9 | 30 | 51000 |
| B-5 | CH₃ | CH₃ | CH₃ | —CH(CH₃)₂ | 60 | 9 | 31 | 96000 |
| B-6 | H | H | H | —C(CH₃)₃ | 60 | 10 | 30 | 32000 |
| B-7 | CH₃ | CH₃ | CH₃ | —CH₂CH(CH₃)₂ | 70 | 5 | 25 | 75000 |

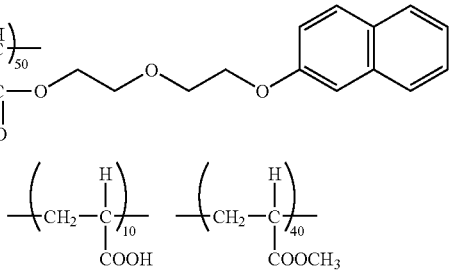

-continued

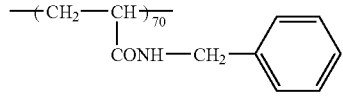
B-16

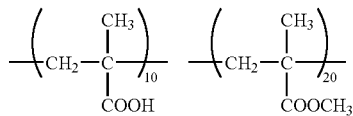
Mw = 34300

| | Mw |
|---|---|
| B-18 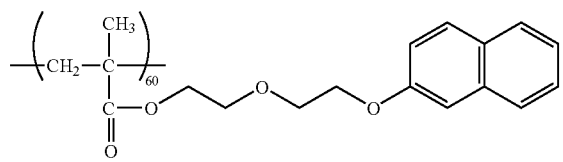 | 33800 |
| B-19 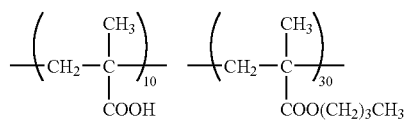<br>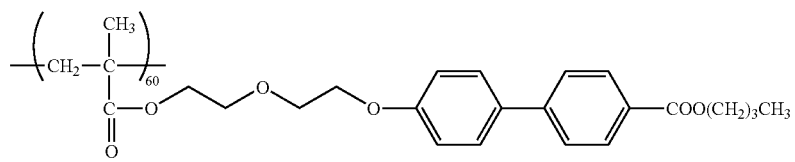<br>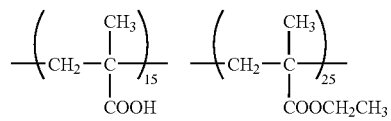 | 39200 |
| B-20 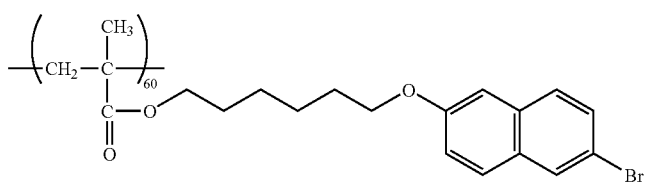<br>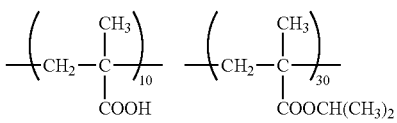 | 55300 |

Content Ratio of Pigment Dispersant to Pigment

The ratio (weight ratio) of a content a pigment dispersant to a content a pigment (pigment dispersant/pigment) in the ink composition is preferably from 25/100 to 140/100, and more preferably from 25/100 to 50/100. When the ratio is 25/100 or more, the dispersion stability and rubbing resistance may tend to be improved. When the content ratio is 140/100 or less, the dispersion stability may tend to be improved as well.

The weight-average molecular weight of the pigment dispersant is preferably from 2,000 to 60,000.

Resin Particles

In addition to the above-described components, each ink included in the ink set of the invention may preferably contain resin fine particles, more preferably contain self-dispersible resin fine particles, and further preferably contain self-dispersible resin fine particles which are in a form of a polymer latex, from the viewpoints of improving fixability and rubbing resistance and preventing interference among applied ink droplets.

Examples of the resin fine particles which may be contained in the ink in a form of a polymer latex include fine particles of acrylic resins, vinyl acetate resins, styrene-butadiene resins, vinyl chloride resins, acryl-styrene resins, butadiene resins, styrenic resins, crosslinked acrylic resins, crosslinked styrenic resins, benzoguanamine resins, phenolic resins, silicone resins, epoxy resins, urethane resins, paraffin resins, and fluorine resins.

The weight average molecular weight of the resin fine particles is preferably from 10,000 to 200,000, and more preferably from 100,000 to 200,000 from the viewpoint of stability of the ink composition.

The average particle diameter of the resin fine particle is preferably from 10 nm to 1 μm, more preferably from 10 nm to 200 nm, even more preferably from 20 nm to 100 nm, and particularly preferably from 20 nm to 50 nm.

From the viewpoints of improving fixability, rubbing resistance and viscosity of the ink composition, the addition amount of the resin fine particles is preferably from 0.5 weight % to 20 weight %, more preferably from 3 weight % to 20 weight %, and even more preferably from 5 weight % to 15 weight % with respect to the total amount of the ink.

The glass transition temperature (Tg) of the resin fine particles is preferably 30° C. or higher, more preferably 40° C. or higher, and even more preferably 50° C. or higher from the viewpoint of storage stability of the ink composition.

The particle diameter distribution of the resin fine particles are not particularly limited, and may be a broad particle diameter distribution or a monodispersed particle diameter distribution. In embodiments, a mixture of two or more kinds of polymer fine particles each having a monodispersed particle diameter distribution may be used.

Surfactant

The ink composition may contain a surfactant as a surface tension adjusting agent (a surfactant).

Examples of the surface tension adjusting agent include a nonionic surfactant, a cationic surfactant, an anionic surfactant, and a betaine surfactant. An amount of the surface tension adjusting agent is preferably adjusted so as to set the surface tension of the ink composition to be from 20 mN/m to 60 mN/m, more preferably from 20 mN/m to 45 mN/m, and still more preferably from 25 mN/m to 40 mN/m, in consideration of favorably applying ink droplets by ink jet recording method.

A compound having a structure in which a hydrophilic moiety and a hydrophobic moiety are included in a molecule thereof can be effectively used as the surfactant. Any of an anionic surfactant, a cationic surfactant, an amphoteric surfactant, and a nonionic surfactant can be used. The polymer substance (polymer dispersant) can be also used as the surfactant.

Examples of the anionic surfactant include sodium dodecylbenzene sulfonate, sodium lauryl sulfate, a sodium alkyl diphenylether disulfonate, a sodium alkylnaphthalene sulfonate, a sodium dialkyl sulfosuccinate, sodium stearate, potassium oleate, sodium dioctylsulfosuccinate, a sodium polyoxyethylene alkylether sulfate, a sodium polyoxyethylene alkylphenylether sulfate, sodium dialkylsulfosuccinate, sodium stearate, sodium oleate, and sodium t-octylphenoxyethoxy-polyethoxyethyl sulfate. The anionic surfactant may be used singly, or in combination of two or more thereof.

Examples of the nonionic surfactant include acetylenediol compounds such as an acetylenediol ethyleneoxide adducts, polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, t-octyl phenoxyethyl polyethoxyethanol, and nonylphenoxyethyl polyethoxyethanol. The nonionic surfactant may be used singly, or in combination of two or more thereof.

Examples of cationic surfactant include a tetraalkyl ammonium salt, an alkylamine salt, a benzalkonium salt, an alkylpyridinium salt, and an imidazolium salt. Specific examples include dihydroxyethyl stearylamine, 2-heptadecenyl-hydroxyethyl imidazoline, lauryldimethyl benzyl ammonium chloride, cetyl pyridinium chloride, and stearamide methylpyridium chloride.

In view of preventing interference among applied ink droplets, nonionic surfactants are preferable, and in particular, acetylenediol compounds are preferable.

The content of the surfactant in the ink composition employed in the invention is not specifically limited, although it is preferably from 0.1 weight % or more, more preferably from 0.5 weight % to 10 weight %, and still more preferably from 1 weight % to 3 weight %.

Other Components

The ink composition of the invention may further contain other additives in accordance with necessity. Examples of such other additives include known additives such as a surfactant, an ultraviolet absorber, an anti-fading agent, an antifungal agent, a pH adjuster, an antirust agent, an antioxidant, an emulsion stabilizer, an antiseptic agent, a defoaming agent, a viscosity adjustment agent, a dispersion stabilizer or a chelating agent.

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

Various organic anti-fading agents and metal complex anti-fading agents can be used as the anti-fading agents. Examples of the organic anti-fading agent include hydroquinones, alkoxyphenols, dialkoxyphenols, phenols, anilines, amines, indans, chromanes, alkoxy anilines, and heterocycles. Examples of the metal complex include a nickel complex and a zinc complex.

Examples of the antifungal agent include sodium dehydroacetate, sodium benzoate, sodium pyridinethione-1-oxide, ethyl p-hydroxybenzoate, 1,2-benzisothiazoline-3-one, sodium sorbate, and sodium pentachlorophenol. The content of antifungal agent in the ink composition is preferably from 0.02 weight % to 1.00 weight %.

The pH adjuster is not specifically limited as long as the pH adjuster can set a pH value of the ink composition to a desired value without exerting an adverse influence on the ink composition to which the pH adjuster is added. The pH adjuster may be selected appropriately in accordance with the purpose. Examples of the pH adjuster include alcohol amines such as diethanol amine, triethanol amine, or 2-amino-2-ethyl-1,3-propanediol; alkali metal hydroxides such as lithium hydroxide, sodium hydroxide, or potassium hydroxide; ammonium hydroxides such as ammonium hydroxide or quaternary ammonium hydroxide; phosphonium hydroxide; and alkali metal carbonates.

Examples of the antirust agent include acid sulfite, sodium thiosulfate, ammonium thiodiglycolate, diisopropyl ammonium nitrite, pentaerythritol tetranitrate, and dicyclohexyl ammonium nitrite.

Examples of the antioxidant include phenolic antioxidants (including hindered phenol antioxidants), amine antioxidants, sulfur antioxidants, and phosphorus antioxidants.

Examples of the chelating agent include sodium ethylenediamine tetraacetate, sodium nitrilotriacetate, sodium hydroxyethyl ethylenediamine triacetate, sodium diethylenetriamine pentaacetate, and sodium uramil diacetate.

Water-Soluble Organic Solvent

The inks included in the ink set of the invention preferably contain a water-soluble solvent respectively. In more preferable embodiments, in each ink, the total content of one or more water-soluble organic solvents having an SP value of less than 27.5 is 90% by weight or more with respect to the total content of water-soluble organic solvents.

Namely, in preferable embodiments, each ink contains the water-soluble solvent for the purpose of inhibition of drying, wetting, acceleration of permeation and the like. Specifically, one or more water-soluble organic solvent(s) is/are preferably contained in the ink(s) for the purpose of inhibition of drying, wetting, acceleration of permeation and the like when the inks are prepared as aqueous ink compositions for inkjet recording method.

The water-soluble organic solvent may be used as the drying inhibitor and/or the wetting agent for the purpose of inhibiting clogging of a nozzle due to drying of the ink composition at an ink jetting port of the nozzle. The water-soluble organic solvent which is expected to work as the drying inhibitor and/or the wetting agent preferably has the vapor pressure which is lower than that of water.

The water-soluble organic solvent may be preferably used as a permeation accelerator for the purpose of enhancing permeation of the ink composition (in particular, the ink composition prepared as an inkjet ink composition) into a paper.

The ink composition preferably contains: the water-soluble solvent having a SP value of 27.5 or less at a content of 90 weight % or more relative to the total amount of one or more water-soluble organic solvent(s); and a compound represented by the following Structural formula (1).

Herein, the "water-soluble solvent having a SP value of 27.5 or less" may be the same as or different from the "compound represented by the following Structural formula (1)".

The solubility parameter (SP value) of a water-soluble organic solvent in the invention is a value represented by a square root of molecular cohesive energy and may be calculated according to the method described in R. F. Fedors, Polymer Engineering Science, 14, p 147 (1967) (which is incorporated herein by reference in its entirety). In the invention, thus-obtained numerical value is adopted.

Structural Formula (1)

Error! Objects cannot be created from editing field codes.

In Structural formula (1), l, m and n each independently represent an integer of 1 or more, and l+m+n=3 to 15. When l+m+n is 3 or greater, the curl suppressing effect can be sufficiently obtained. When l+m+n exceeds 15, ink jetting properties may be deteriorated. l+m+n is preferably 3 to 12, and more preferably 3 to 10.

In Structural formula (1), AO represents at least one of an oxyethylene group (EO) and an oxypropylene group (PO), and preferably an oxypropylene group. Each AO in $(AO)_l$, $(AO)_m$, and $(AO)_n$ may be the same or different.

Specific examples of the solvent having an SP value of 27.5 or less and the compound represented by Structural formula (1) are shown below; however, the present invention is not limited to these. SP values of the compounds are indicated in parentheses respectively.

Diethylene glycol monomethylether (22.4)
Diethylene glycol monobutylether (21.5)
Triethylene glycol monobutylether (21.1)
Dipropylene glycol monomethylether (21.3)
Dipropylene glycol (27.2)

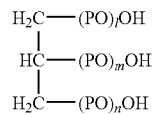

l + m + n = 3 (26.4) PO: propyleneoxy

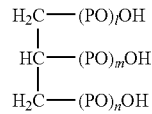

l + m + n = 4 (24.9) PO = propyleneoxy

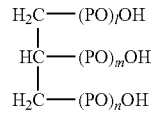

l + m + n = 5 (23.9) PO = propyleneoxy

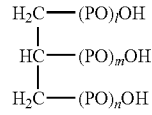

l + m + n = 6 (23.2) PO = propyleneoxy

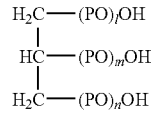

l + m + n = 7 (22.6) PO = propyleneoxy $nC_4H_9O(AO)_4$—H
(AO is EO or PO (the ratio of EO:PO=1:1)) (20.1)
$nC_4H_9O(AO)_{10}$—H
(AO is EO or PO (the ratio of EO:PO=1:1)) (18.8)
$HO(A'O)_{40}$—H
(A'O is EO or PO (the ratio of EO:PO=1:3)) (18.7)
$HO(A"O)_{55}$—H
(A"O is EO or PO (the ratio of EO:PO=5:6)) (18.8)
$HO(PO)_3$—H (24.7)
$HO(PO)_7$—H (21.2)
1,2-hexanediol (27.4)

In the above formulae, EO represents an ethyleneoxy group, and PO represents a propyleneoxy group.

A solvent which is different from the solvent water-soluble solvent having an SP value of 27.5 or less may be further employed. Examples of a water-soluble organic solvent which can be additionally used as such other solvent include alkanediols (polyhydric alcohols) including glycerin, 1,2,6-hexanetriol, trimethylolpropane, and alkanediols such as ethyleneglycol, propyleneglycol, diethyleneglycol, triethyleneglycol, tetraethyleneglycol, pentaethyleneglycol, dipropyleneglycol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; so-called solid wetting agents including saccharides such as glucose, mannose, fructose, ribose, xylose, arabinose, galactose, aldonic acid, glucitol, maltose, cellobiose, lactose, sucrose, trehalose or maltotriose; sugar alcohols; hyaluronic acids; and ureas; alkyl alcohols having 1 to 4 carbon atoms such as ethanol, methanol, butanol, propanol or isopropanol;

glycol ethers such as ethyleneglycol monomethyl ether, ethyleneglycol monoethyl ether, ethyleneglycol monobutyl ether, ethyleneglycol monomethyl ether acetate, diethyleneglycol monomethyl ether, diethyleneglycol monoethyl ether, diethyleneglycol mono-n-propyl ether, ethyleneglycol mono-iso-propyl ether, diethyleneglycol mono-iso-propyl ether, ethyleneglycol mono-n-butyl ether, ethyleneglycol mono-t- butyl ether, diethyleneglycol mono-t-butyl ether, 1-methyl-1-methoxybutanol, propyleneglycol monomethyl ether, propyleneglycol monoethyl ether, propyleneglycol mono-t-butyl ether, propyleneglycol mono-n-propyl ether, propyleneglycol mono-iso-propyl ether, dipropyleneglycol monomethyl ether, dipropyleneglycol monoethyl ether, dipropyleneglycol mono-n-propyl ether or dipropyleneglycol mono-iso-propyl ether; 2-pyrrolidone, N-methyl 2-pyrrolidone, 1,3-dimethyl-2-imidazolidinone, formamide, acetamide, dimethylsulfoxide, sorbit, sorbitan, acetin, diacetin, triacetin, and sulfolane. One or more among these solvents may be employed as the other solvent.

A polyhydric alcohol can be preferably employed as an anti-drying agent and/or a wetting agent. Examples of the polyhydric alcohol include glycerin, ethyleneglycol, diethyleneglycol, triethyleneglycol, propyleneglycol, dipropyleneglycol, tripropyleneglycol, 1,3-butanediol, 2,3-butanediol, 1,4-butanediol, 3-methyl-1,3-butanediol, 1,5-pentanediol, tetraethyleneglycol, 1,6-hexanediol, 2-methyl-2,4-pentanediol, polyethyleneglycol, 1,2,4-butanetriol, and 1,2,6-hexanetriol. One or more among these solvents may be employed as the other solvent.

A polyol compound can be preferably employed as a penetrating agent.

Examples of the polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol, or 2,2,4-trimethyl-1,3-pentanediol. Among these compounds, 2-ethyl-1,3-hexanediol and 2,2,4-trimethyl-1,3-pentanediol are preferable.

The water-soluble solvent may be used alone or in combination of two or more thereof.

The sum of the content(s) of the water-soluble solvent(s) in the ink composition is preferably from 1 weight % to 60 weight %, more preferably from 5 weight % to 40 weight %, and particularly preferably from 10 weight % to 30 weight % with respect to the total amount of the ink composition from the viewpoint of obtaining ink stability and ink ejection reliability.

The ink composition may contain water. There is no particular limitation to the amount contained in the ink composition. In embodiments, the content of water in the respective ink of the ink set may be preferably from 10 weight % to 99 weight %, more preferably from 30 weight % to 80 weight %, and further preferably from 50 weight % to 70 weight % with respect to the total amount of the ink from the viewpoint of obtaining ink stability and ink ejection reliability.

In embodiments, each ink included in the ink set preferably has a solid content of from 8 weight % to 14 weight %, more preferably from 8 weight % to 13 weight %, and further preferably from 9 weight % to 13 weight % with respect to the total amount of the ink from the viewpoint of improving rubbing resistance and glossiness.

Higher image density and higher rubbing resistance may tend to be achieved when the ink composition has a solid content of 8 weight % or more. Higher ink ejection reliability may tend to be obtained when the ink composition has a solid content of 14 weight % or less.

In embodiments, the S2, that is the solid content of an ink that has the largest solid content among inks included in the ink set, may be equal to the S1, that is the solid content of an ink that has the smallest solid content among inks included in the ink set.

Physical Properties of Ink

The surface tension of each ink in the ink set is preferably 20 mN/m to 60 mN/m, more preferably 20 mN/m to 45 mN/m, and still more preferably 25 mN/m to 40 mN/m from the viewpoint of ink ejection reliability when applied to inkjet recording.

The surface tension is measured under the conditions of a temperature of 25° C. using AUTOMATIC SURFACE TENSIOMETER CBVP-Z (trade name, manufactured by Kyowa Interface Science Co., LTD.).

The viscosity of each ink in the ink set is preferably in the range of 1.2 mPa·s to 15.0 mPa·s, more preferably 2 mPa·s or more but less than 13 mPa·s, and still more preferably 2.5 mPa·s or more but 10 mPa·s or less. The viscosity is measured under the conditions of a temperature of 20° C. using VISCOMETER TV-22 (trade name, manufactured by TOKI SANGYO CO. LTD).

The ink set of the present invention, which includes at least the magenta ink and the cyan ink, preferably also includes a yellow ink and a black ink in view of full color image formation and color tone adjustment.

Colorants that may be used in the yellow ink and the black ink are not particularly limited; however, the above-described yellow pigments and black pigments are preferable. The pigment configuration of the yellow pigment and the black pigment is preferably the same as the configuration of the magenta ink and cyan ink pigments. For example, if the magenta ink and cyan ink pigments are encapsulated pigments, the yellow ink and the black ink pigments are preferably also encapsulated pigments.

In the formulations for the above-described yellow ink and black ink, conditions other than for solid matter (i.e., conditions for component type and amount) are preferably the same as for the magenta ink and the cyan ink in view of enabling formation of images with uniform image quality.

Further, the ink properties (physical properties) of the yellow ink and the black ink are preferably the same as the ink properties of the magenta ink and the cyan ink.

Image Forming Method

The image forming method of one aspect of the invention includes at least: applying the inks of the ink set to a recording medium; and applying, onto the recording medium, a treatment liquid which contains coagulation accelerator which enhances coagulation of components in the inks.

The image forming method is preferably ink jet recording method employing ink jet recording with the ink set of one embodiment of the invention, although the ink set of the invention may be also employed for applications using general writing materials, recorders, pen plotters or the like.

Preferable examples of the ink jet recording method include those including imparting energy to the inks of the ink set to eject the inks to form an image on a desired image receiving material such as plain paper, resin coated paper, inkjet paper such as those described in JP-A-Nos. 8-169172, 8-27693, 2-276670, 7-276789, 9-323475, 62-238783, 10-153989, 10-217473, 10-235995, 10-217597 or 10-337947, a film, electrophotographic common paper, fabrics, glass, metal or ceramics. In embodiments, the inkjet recording method described in the paragraphs 0093 to 0105 of JP-A No. 2003-306623 can be employed as a preferable inkjet recording method.

In the formation of an image, a polymer latex compound may also be used to impart glossiness and water resistance to the image, and to improve weather resistance of the image. The latex compound may be applied before, after, or at the same time of the application of the ink composition. The latex compound may be imparted in a recording medium, may be contained in the aqueous ink composition, or may be prepared in an independent liquid for application. Specific examples thereof include those described in JP-A Nos. 2002-166638 (Application No. 2000-363090), 2002-121440 (Application No. 2000-315231), 2002-154201 (Application No. 2000-354380), 2002-144696 (Application No. 2000-343944), and 2002-080759 (Application No. 2000-268952).

In preferable embodiments, the image forming method includes reacting, with the respective inks of the ink set, the treatment liquid which contains a coagulation accelerator which enhances coagulation of components in the respective inks of the ink set on a recording medium to record an image.

The coagulation accelerator may be applied onto the recording medium either in advance of the application of the ink onto the recording medium or after the application of the ink onto the recording medium to have the ink and the coagulation accelerator react with each other. In preferable embodiments, the coagulation accelerator is applied onto the recording medium in advance of the application of the ink onto the recording medium.

Namely, in preferable embodiments, the image forming method may include:

(1) applying, onto a recording medium, a treatment liquid which contains a coagulation accelerator which enhances coagulation of components in the respective inks of the ink set (application of treatment liquid); and (2) applying, onto the recording medium having the treatment liquid applied thereon, the inks of the ink set (application of ink).

In preferable embodiments, the image forming method may further include thermally fixing an image formed of the inks applied onto the recording medium.

There is no particular limitation to the thermal fixing as long as it includes melt-fixing latex particles contained in the ink employed in the ink jet recording method. Any known methods may be selected therefor according to purposes.

The coagulation accelerator may be either a solid or a liquid. In preferable embodiments, the coagulation accelerator may be a liquid such as a solution, a dispersion or an emulsion from the viewpoint of uniform application.

The image forming method may further include one or more arbitrarily steps. There is no particular limitation to the arbitrarily steps, and may be appropriately selected. Examples thereof include drying-removing.

The drying-removing is not particularly limited as long as it performs removal of solvents of the inks applied to the recording medium, and may be appropriately selected.

There is no particular limitation to the recording medium. Examples of the recording medium include plain paper, high quality paper, and resin coated paper.

Printed matters formed by recording using the ink set of one aspect of the invention may be image recorded materials having printed matter-like glossiness, curling suppression property, and wide range of color reproducibility.

EXAMPLES

Hereinafter, the invention will be described in more detail with reference to examples, although the invention is not limited to the examples. "Parts" and "%" respectively indicate quantity in terms of mass, unless otherwise specified.

Example 1

Preparation of Ink
Synthesis of Polymer Dispersant P-1

A polymer dispersant P-1 was synthesized according to the following scheme.

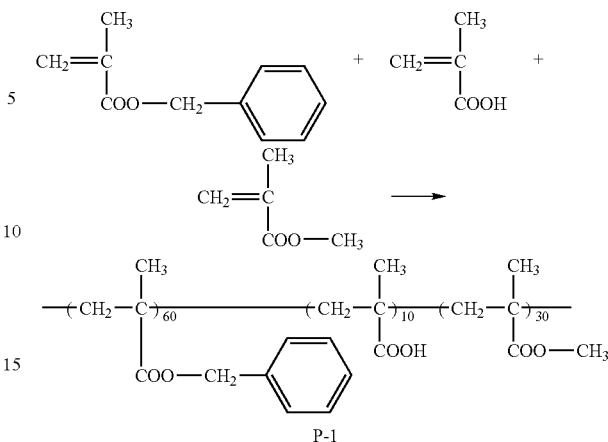

Methyl ethyl ketone (88 g) was placed in a 1000 ml three-neck flask equipped with a stirrer and a condenser tube, and heated to 72° C. under a nitrogen atmosphere. Separately, 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone to form a solution. The solution is added dropwise to the liquid in the flask over three hours. After the dropwise addition was completed, the reaction was further continued for one hour. Then, a solution obtained by dissolving 0.42 g of dimethyl 2,2'-azobisisobutyrate in 2 g of methyl ethyl ketone was added to the reaction solution, and the reaction solution was heated to 78° C. and heated at this temperature for 4 hours. The obtained reaction solution was reprecipitated twice with an excess quantity of hexane, and the precipitated resin was dried to obtain 96 g of the polymer dispersant P-1.

The formulation of the obtained resin was identified with $^1$H-NMR. The weight average molecular weight (Mw) was determined by a GPC method, and was found to be 44,600. Furthermore, the acid value of the polymer was obtained in accordance with the method described in HS Standard (JIS-K0070 (1992), the disclosure of which is incorporated by reference herein), and was found to be 65.2 mgKOH/g.

Other polymer dispersants employable in the invention may be also synthesized in the similar manner.

Synthesis and Preparation of Self-Dispersible Polymer Particles
Synthesis of Self-Dispersible Polymer Particles PL-1

360.0 g of methyl ethyl ketone was placed in a 2 L three necked flask equipped with a stirrer, a thermometer, a reflux condenser tube, and a nitrogen gas introducing pipe, and the temperature was raised to 75° C. Thereafter, while maintaining the temperature inside the flask at 75° C., a mixed solution containing 180.0 g of phenoxyethyl acrylate, 162.0 g of methyl methacrylate, 18.0 g of acrylic acid, 72 g of methyl ethyl ketone, and 1.44 g of V-601 (trade name, manufactured by Wako Pure Chemical Ind. Ltd.) was added dropwise at a constant rate so that the dropwise addition was completed in 2 hours. After completion of the dropping, a solution containing 0.72 g of V-601 (described above) and 36.0 g of methyl ethyl ketone was added, and stirred at 75° C. for 2 hours. Further, a solution containing 0.72 g of V-601 (described above) and 36.0 g of isopropanol was added, and stirred at 75° C. for 2 hours. Thereafter, the temperature was raised to 85° C., and the stirring was continued for further 2 hours, thereby obtaining a resin solution of a phenoxy ethyl acrylate/methyl methacrylate/acrylic acid (=50/45/5 [weight ratio]) copolymer.

The weight average molecular weight (Mw) of the obtained copolymer was 64,000 (calculated by gel permeation chromatography (GPC) in terms of polystyrene) and the acid value was 38.9 (mgKOH/g).

Next, 668.3 g of the obtained resin solution was weighed, and 388.3 g of isopropanol and 145.7 ml of aqueous 1 mol/L NaOH solution were added. Then, the temperature inside the reactor was raised to 80° C. Next, 720.1 g of distilled water was added dropwise at a rate of 20 ml/min so that the copolymer resin is dispersed in water. Thereafter, the resultant was held under an atmospheric pressure at a temperature inside the reactor of 80° C. for 2 hours, and then maintained at 85° C. for 2 hours, and then further maintained at 90° C. for 2 hours. Then, the pressure inside the reactor was reduced, and the isopropanol, methyl ethyl ketone, and distilled water were distilled off in the total amount of 913.7 g, to provide a water dispersion of the self-dispersible polymer particles PL-1 having a solid content of 28.0 weight %.

Preparation of Pigment-Containing Resin Particles
Preparation of Dispersion Y 10 parts by weight of Pigment yellow 74 (trade name: IRGALITE YELLOW GS, manufactured by Ciba Japan K.K.), 5 parts by weight of the polymer dispersant P-1, 42 parts by weight of methyl ethyl ketone, 5.5 parts of an aqueous solution of NaOH (1 mol/L), and 87.2 parts of ion-exchanged water were mixed, and the mixture was dispersed by a bead mill for 2 to 6 hours using zirconia beads with a diameter of 0.1 mm.

Methyl ethyl ketone was removed from the obtained dispersion at 55° C. under reduced pressure, and a part of water was removed, whereby a dispersion Y, that is a dispersion liquid with a pigment concentration of 10.2% by mass, was obtained.

Preparation of Dispersion M

A dispersion M, that is a dispersion liquid with a pigment concentration of 10.2% by mass, was prepared in the similar manner as that of the dispersion Y except that Pigment red 122 (trade name: JET MAGENTA DMQ, manufactured by Ciba Japan K.K.) was used in place of the Pigment yellow 74.

Preparation of Dispersion C

A dispersion C, that is a dispersion liquid with a pigment concentration of 10.2% by mass, was prepared in the similar manner as that of the dispersion Y except that Pigment blue 15:3 (trade name: PHTHALOCYANINE BLUE A220, manufactured by Ciba Japan K.K.) was used in place of the Pigment yellow 74.

Preparation of Dispersion K

A dispersion K, that is a dispersion liquid with a pigment concentration of 10.2% by mass, was prepared in the similar manner as that of the dispersion Y except that carbon black (trade name: NIPEX 180-IQ, manufactured by Degussa) was used in place of the Pigment yellow 74.

Preparation of Yellow Ink Y1

A yellow ink Y1 was prepared to have the following formulation by using the dispersion Y (dispersion of pigment-containing resin particles).

| Formulation of Yellow ink Y1 | |
| --- | --- |
| Dispersion Y | 29.4 parts |
| Latex (water dispersion of the self-dispersible polymer particles PL-1) (solid content) | 19.6 parts |
| Compound A (compound represented by Structural formula(1), l + m + n = 3, SP value: 26.4) | 20 parts |
| OLFINE E1010 (trade name, manufactured by Nissin Chemical Industry, Inc., Surfactant) | 1 part |
| Ion exchange water | balance (to adjust the total amount of the composition to 100 parts) |

Preparation of Yellow Inks Y2 to Y5

Yellow inks Y2 to Y5 were prepared in the similar manner as that of the yellow ink Y1 except that, as shown in the following Tables 1 to 3, the amount of the dispersion Y (29.4 parts) was changed to 39.2 parts, 29.4 parts, 39.2 parts, or 40.2 parts, and the solid content of the latex (water dispersion of the self-dispersible polymer particles PL-1) (19.6 parts) was changed to 17.9 parts, 33.9 parts, 12.5 parts or 2.7 parts respectively. In addition, 16 parts of the compound A and 4 parts of glycerin were employed in place of the 20 parts of the compound A in the yellow ink Y2.

Preparation of Magenta Ink M1

A magenta ink M1 was prepared to have the following formulation by using the dispersion M (dispersion of pigment-containing resin particles).

| Formulation of Magenta ink M1 | |
| --- | --- |
| Dispersion M | 49 parts |
| Latex (water dispersion of the self-dispersible polymer particles PL-1) (solid content) | 12.5 parts |
| Compound A (compound represented by Structural formula(1), l + m + n = 3, SP value: 26.4) | 20 parts |
| OLFINE E1010 (trade name, manufactured by Nissin Chemical Industry, Inc., Surfactant) | 1 part |
| Ion exchange water | balance (to adjust the total amount of the composition to 100 parts) |

Preparation of Magenta Inks M2 to M8

Magenta inks M2 to M8 were prepared in the similar manner as that of the magenta ink M1 except that, as shown in the following Tables 1 to 3, the amount of the dispersion M (49 parts) was changed to 59.4 parts, 49.0 parts, 49.0 parts, 49.0 parts, 41.2 parts, 34.3 parts, or 43.1 parts, and the solid content of the latex (water dispersion of the self-dispersible polymer particles PL-1) (12.5 parts) was changed to 10.7 parts, 23.2 parts, 5.4 parts, 19.6 parts, 13.2 parts, 2.0 parts, or 15.7 parts respectively.

Preparation of Cyan Ink C1

A cyan ink C1 was prepared to have the following formulation by using the dispersion M (dispersion of pigment-containing resin particles).

| Formulation of Cyan ink C1 | |
| --- | --- |
| Dispersion C | 24.5 parts |
| Latex (water dispersion of the self-dispersible polymer particles PL-1) (solid content) | 22.3 parts |
| Compound A (compound represented by Structural formula(1), l + m + n = 3, SP value: 26.4) | 20 parts |
| OLFINE E1010 (trade name, manufactured by Nissin Chemical Industry, Inc., Surfactant) | 1 part |
| Ion exchange water | balance (to adjust the total amount of the composition to 100 parts) |

Preparation of Cyan Inks C2 to C7

Cyan inks C2 to C7 were prepared in the similar manner as that of the cyan ink C1 except that, as shown in the following Tables 1 to 3, the amount of the dispersion C (24.5 parts) was changed to 22.5 parts, 24.5 parts, 24.5 parts, 27.5 parts, 24.5 parts, or 25.5 parts, and the solid content of the latex (water dispersion of the self-dispersible polymer particles PL-1) (22.3 parts) was changed to 27.0 parts, 36.6 parts, 15.2 parts, 20.7 parts, 2.3 parts, or 21.8 parts respectively.

Preparation of Black Ink K1

A black ink K1 was prepared to have the following formulation by using the dispersion M (dispersion of pigment-containing resin particles).

| Formulation of Black ink K1 | |
|---|---|
| Dispersion K | 39.2 parts |
| Latex (water dispersion of the self-dispersible polymer particles PL-1) (solid content) | 14.3 parts |
| Compound A (compound represented by Structural formula(1), l + m + n = 3, SP value: 26.4) | 20 parts |
| OLFINE E1010 (trade name, manufactured by Nissin Chemical Industry, Inc., Surfactant) | 1 part |
| Ion exchange water | balance (to adjust the total amount of the composition to 100 parts) |

Preparation of Black inks K to K4

Black inks K to K4 were prepared in the similar manner as that of the black ink K1 except that, as shown in the following Tables 1 to 3, the solid content of the latex (water dispersion of the self-dispersible polymer particles PL-1) (14.3 parts) was changed to 17.9 parts, 28.5 parts, or 7.1 parts respectively.

Preparation of Clear Ink

A clear ink was prepared in the similar manner as that of the yellow ink Y1 except that the use of the dispersion Y was omitted.

Preparation of Treatment Liquid

A treatment liquid was prepared by mixing components to have the following formulation. The viscosity, surface tension, and pH (25±1° C.) of the treatment liquid were measured to turn out to be 4.9 mPa·s, 24.3 mN/m, and 1.5, respectively.

| Formulation of Treatment liquid | |
|---|---|
| Dimethylamine/Epichlorohydrin copolymer (Polymerization ratio 1:1, Weight average molecular weight 6000) | 5 weight % |
| Diethylene glycol monoethyl ether (manufactured by Wako Pure Chemical Ind. Ltd.) | 20.0 weight % |
| ZONYL FSN-100 (trade name, manufactured by DuPont) | 1.0 weight % |
| Ion exchange water | 74 weight % |

The viscosity of the aqueous ink composition was measured using VISCOMETER TV-22 (trade name, manufactured by Told Sangyo Co., Ltd.) at 25° C. The measurement of the surface tension was performed under the conditions of a temperature of 20° C. using an automatic surface tensiometer CBVP-Z (trade name, manufactured Kyowa Interface Science Co., LTD.). The pH was measured at 25±1° C.

Preparation of Ink Set 1

An ink set 1, which includes the yellow, magenta, cyan and black inks and has the conditions shown in Table 1, was prepared.

Image formation and Evaluation

A sheet of TOKUBISHI ART RYOMEN N (trade name, manufactured by Mitsubishi Seishi Co., basis weight: 84.9 g/m$^2$) was placed in a fixing manner on a stage which is transferable in a predetermined direction at 500 mm/sec. The treatment liquid was coated onto the sheet with a wire bar coated so as to make the thickness of the coated film be about 5 μm, and the coated film is subjected to drying at 50° C. for 2 seconds immediately after the coating, so as to provide an image recording medium.

DIMATIX MATERIAL PRINTER DMP-2831 (trade name, manufactured by Fuji Film Dimatix Inc.) that was equipped with a 10 μl ejection cartridge formed by modifying DMC-11610 (trade name, manufactured by Fuji Film Dimatix Inc.) to allow liquid supply from the outside was used as an inkjet recording apparatus. A solid image was printed with inks of the ink set 1 on the recording medium so that the ink coating amount of each of the inks became 5 g/m$^2$ (process of application of ink composition). The printed image was then heated at 60° C. for 3 minutes was further performed to provide a sample for evaluation (process of removal of organic solvent). The sample was subjected to the following evaluations.

Evaluation of Ink Set

1. Evaluation of Glossiness of Printed Matter

Glossiness of patches formed from the ink set and having each color of sample colors of Japan Color 2001 were measured. Specifically, inks were applied (printed) onto image recording media, onto which the treatment liquid was provided in advance, to form images having a common pattern. The thus-formed images having the respective colors and same color density were subjected to measurement of glossiness with a handy glossiness measurement device (trade name: GLOSSCHECKER IG-331, manufactured by Horiba Ltd., measured at 60°), and an average value of difference in glossiness among the samples were calculated.

Criteria of Evaluation of Glossiness of Printed Matter

A: Average value of the difference in glossiness does not exceed 10.

AB: Average value of the difference in glossiness is 5% or more and is smaller than 10%.

B: Average value of the difference in glossiness is 10% or more and is smaller than 15%.

X: Average value of the difference in glossiness is 15% or more.

2. Evaluation of Curling Property

A solid image was printed with inks of the ink set 1 on the recording medium with an ink coating amount of each ink of 5 g/m$^2$, and then a strip having a size of 5 mm×50 mm was cut out of the recording medium such that the length direction of the strip is in the direction of curl, and the strip was allowed to stand for 24 hours at either (1) at a temperature of 30° C. and a relative humidity of 80% or (2) at a temperature of 25° C. and a relative humidity of 50%. Then, a curling behavior (curl value) of the sample was measured and evaluated according to the following criteria. The evaluation results are shown in Table 4.

Evaluation Criteria:

A: Curvature C does not exceed 20.

AB: Curvature C exceeds 20.

Method of Measuring Curvature:

The sample strip having a size of 5 mm×50 mm, the length of 50 mm being in the curling direction, was measured with a curl measurement plate, and a curl value (C) was read. The curl of the sample was regarded as an arc of a circle with a radius of R, and the curl was calculated according to the equation of C=1/R(m).

3. Evaluation of Rubbing Resistance

Unprinted sheet of TOKUBISHI ART (described above) was cut into 10 mm×50 mm and used to wrap around a paperweight (weight: 470 g, size: 15 mm×30 mm×120 mm) so as to make a contact area of the cut sheet of the unprinted TOKUBISHI ART (described above) and a sample to be evaluated be 150 mm². The printed sample for evaluation prepared for the evaluation of curling property was rubbed with the wrapped paperweight back-and-forth three times, the load applied to the sample by this operation being equivalent to 260 kg/m². The printed surface of the sample after being rubbed was visually observed, and rubbing resistance of the sample was evaluated according to the following evaluation criteria.

Evaluation Criteria:

A: No peeling (separation) of the image (color material) from the printed surface was visually observed.

AB: Almost no peeling (separation) was visually observed.

4. Evaluation of Image Quality (Avoidance of Interference Between Ejected Droplets)

A sample sheet having a printed image formed from the ink set 1 and having a size of 50 mm×50 mm was dried, fixed by heating at 100° C. for 10 seconds, visually observed by naked eyes and evaluated with respect to image quality (avoidance of interference between ejected droplets of ink) according to the following evaluation criteria.

Evaluation Criteria:

A: No image irregularity of printed image was visually observed.

B: Irregularity of printed image was partially observed.

5. Evaluation of Jetting Stability

Having jetting the inks using an ink jet recording apparatus (trade name: DIMATIX MATERIALS PRINTER DMP-2831, manufactured by FUJIFILM Dimatix, Inc.), evaluations with respect to the following evaluation items were performed and whether the evaluation items were satisfied or not were judged in the following manner. Image irregularity of printed images was visually observed by naked eyes. Jet ratio is defined as "(number of nozzles which performed jetting)/(number of all nozzles)×100(%)".

Evaluation Items:

(1) Jet ratio observed after continuous jetting for 60 minutes is 90% or more.

(2) Jet ratio observed after posing for 30 minutes succeeding to jetting for one minute is 90% or more.

(3) Image irregularity is not observed in the solid image

Evaluation Criteria:

A: Satisfactory in all the three items.

AB: Unsatisfactory in one item among the three items.

B: Unsatisfactory in two or more items among the three items.

6. Evaluation of Range of Color Reproduction

The CIE a* and b* values of the standard print of Japan Color 2001 at brightness of 50 was measured with SPECTROEYE (trade name, manufactured by X-Rite), and the multiplication of a*×b* was defined as area (1). The CIE a* and b* values of a solid image sample formed of the yellow, magenta and cyan inks of the ink set 1 at brightness of 50 was measured in the similar manner, and the multiplication of a*×b* was defined as area (2). The area ratio calculated from area (2)/area (1) is used for evaluating the range of color reproduction achieved by the ink set 1.

Evaluation Criteria:

A: The area ratio is 100% or more.

AB: The area ratio is 95% or more but less than 100%.

X: The area ratio is less than 95%.

Examples 1 to 5 and Comparative Examples 1 and 2

Ink sets 2 to 7 were respectively prepared by employing any one of the yellow inks, any one of the magenta inks, any one of the cyan inks and any one of the black inks as shown in the following Tables 1 to 3.

The ink sets 2 to 7 were respectively subjected to the evaluations in the similar manners as for the ink set 1.

Comparative Example 3

Ink set 8 was prepared by employing the yellow ink, the magenta ink, the cyan ink and the clear ink as shown in the following Table 3.

The ink set 8 was subjected to the evaluations in the similar manners as for the ink set 1, in which the ejection amount of the clear ink was arranged so that the total amount of resin component thereof per unit are is substantially the same as those of other inks.

Example 6

Ink set 9 was prepared by employing the yellow ink, the magenta ink, the cyan ink and the black ink as shown in the following Table 3.

The ink set 9 was subjected to the evaluations in the similar manners as for the ink set 1.

TABLE 1

|  |  | Ink set 1 | Ink set 2 | Ink set 3 |
|---|---|---|---|---|
| Yellow ink | Ink | Y1 | Y1 | Y2 |
|  | Pigment | PY74 | PY74 | PY74 |
|  | Concentration (%) | 3 | 3 | 4 |
|  | Solid content (%) | 10 | 10 | 11 |
| Magenta ink | Ink | M1 | M1 | M2 |
|  | Pigment | PR122 | PR122 | PR122 |
|  | Concentration (%) | 5 | 5 | 6 |
|  | Solid content (%) | 11 | 11 | 12 |
| Cyan ink | Ink | C1 | C1 | C2 |
|  | Pigment | PR15:3 | PR15:3 | PR15:3 |
|  | Concentration (%) | 2.5 | 2.5 | 2.3 |
|  | Solid content (%) | 10 | 10 | 11 |
| Black ink | Ink | K1 | K1 | K2 |
|  | Pigment | CB | CB | CB |
|  | Concentration (%) | 4 | 4 | 4 |
|  | Solid content (%) | 10 | 10 | 11 |
| Pigment Conc. Ratio (M/C) |  | 2 | 2 | 2.6 |
| Solid content ratio S2/S1 (Maximum solid content/Minimum solid content) |  | 1.1 | 1.1 | 1.1 |
| Content of Solvent having SP value of 27.5 or less (%) |  | 100 | 80 | 100 |

TABLE 2

|  |  | Ink set 4 | Ink set 5 | Ink set 6 |
|---|---|---|---|---|
| Yellow ink | Ink | Y3 | Y4 | Y1 |
|  | Pigment | PY74 | PY74 | PY74 |
|  | Concentration (%) | 3 | 3 | 3 |
|  | Solid content (%) | 14 | 8 | 10 |
| Magenta ink | Ink | M3 | M4 | M5 |
|  | Pigment | PR122 | PR122 | PR122 |

TABLE 2-continued

|  |  | Ink set 4 | Ink set 5 | Ink set 6 |
|---|---|---|---|---|
|  | Concentration (%) | 5 | 5 | 5 |
|  | Solid content (%) | 14 | 9 | 13 |
| Cyan ink | Ink | C3 | C4 | C1 |
|  | Pigment | PR15:3 | PR15:3 | PR15:3 |
|  | Concentration (%) | 2.5 | 2.5 | 2.5 |
|  | Solid content (%) | 14 | 8 | 10 |
| Black ink | Ink | K3 | K4 | K1 |
|  | Pigment | CB | CB | CB |
|  | Concentration (%) | 4 | 4 | 4 |
|  | Solid content (%) | 14 | 8 | 10 |
| Pigment Conc. Ratio (M/C) |  | 2 | 2 | 2 |
| Solid content ratio S2/S1 (Maximum solid content/Minimum solid content) |  | 1.0 | 1.1 | 1.3 |
| Content of Solvent having SP value of 27.5 or less (%) |  | 100 | 100 | 100 |

TABLE 3

|  |  | Ink set 7 | Ink set 8 | Ink set 9 |
|---|---|---|---|---|
| Yellow ink | Ink | Y1 | Y5 | Y1 |
|  | Pigment | PY74 | PY74 | PY74 |
|  | Concentration (%) | 3 | 4.1 | 3 |
|  | Solid content (%) | 10 | 6.9 | 10 |
| Magenta ink | Ink | M6 | M7 | M8 |
|  | Pigment | PR122 | PR122 | PR122 |
|  | Concentration (%) | 4.2 | 3.5 | 4.4 |
|  | Solid content (%) | 10 | 5.8 | 11 |
| Cyan ink | Ink | C5 | C6 | C7 |
|  | Pigment | PR15:3 | PR15:3 | PR15:3 |
|  | Concentration (%) | 2.8 | 2.5 | 2.6 |
|  | Solid content (%) | 10 | 4.4 | 10 |
| Black ink | Ink | K1 | — | K1 |
|  | Pigment | CB | — | CB |
|  | Concentration (%) | 4 | — | 4 |
|  | Solid content (%) | 10 | — | 10 |
| Pigment Conc. Ratio (M/C) |  | 1.5 | 1.4 | 1.7 |
| Solid content ratio S2/S1 (Maximum solid content/Minimum solid content) |  | 1.0 | 1.6 | 1.1 |
| Content of Solvent having SP value of 27.5 or less (%) |  | 100 | 100 | 100 |

It is understood from Table 4 that the embodiments of the ink set of the invention exhibit excellent color reproducibility as well as maintaining printed matter-like glossiness. The embodiments of the ink set of the invention further exhibit excellent curling resistance, rubbing resistance, image quality and jetting stability.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink set comprising: a magenta ink comprising a pigment; and a cyan ink comprising a pigment, wherein: a ratio of M/C, in which M is the concentration of the pigment in the magenta ink, and C is the concentration of the pigment in the cyan ink, is from 1.8 to 2.3; and a ratio of S2/S1, in which S2 is the solid content of an ink that has the largest solid content among the inks included in the ink set, and S1 is the solid content of an ink that has the smallest solid content among the inks included in the ink set, is 1.2 or less.

2. The ink set of claim 1, further comprising a yellow ink and a black ink.

3. The ink set of claim 1, wherein the solid content of each ink included in the ink set is from 8 weight % to 14 weight %.

4. The ink set of claim 1, wherein each ink included in the ink set comprises resin particles.

5. The ink set of claim 4, wherein the resin particles are self-dispersible resin particles.

6. The ink set of claim 1, wherein each ink included in the ink set comprises one or more water-soluble solvents, and in each ink, the total content of one or more water-soluble organic solvents having an SP value of less than 27.5 is 90% by weight or more with respect to the total content of water-soluble organic solvents.

7. The ink set of claim 1, wherein at least a part of the surface of a particle of the pigment is covered with a water-insoluble resin.

8. The ink set of claim 1, wherein the magenta ink comprises a quinacridone pigment, and the cyan ink comprises a phthalocyanine pigment.

9. An image forming method comprising: applying, onto a recording medium, the inks of the ink set of claim 1; and

TABLE 4

|  |  | Evaluation | | | | | |
|---|---|---|---|---|---|---|---|
|  | Ink set | Glossiness | Curling resistance | Rubbing resistance | Image quality | Jetting stability | Color reproducibility |
| Example 1 | Ink set 1 | A | A | A | A | A | A |
| Example 2 | Ink set 2 | A | AB | A | A | A | A |
| Example 3 | Ink set 3 | A | A | A | A | A | AB |
| Example 4 | Ink set 4 | AB | A | A | A | AB | A |
| Example 5 | Ink set 5 | A | A | AB | A | A | A |
| Comparative example 1 | Ink set 6 | X | A | A | A | B | A |
| Comparative example 2 | Ink set 7 | A | A | A | A | A | X |
| Comparative example 3 | Ink set 8 (including Clear ink) | B | A | A | B | B | X |
| Example 6 | Ink set 9 | A | A | A | A | A | AB | applying, onto the recording medium, a treatment liquid comprising an aggregation accelerator that coagulates components of the inks.

10. The image forming method of claim 9, further comprising thermally fixing an image formed of the inks applied onto the recording medium.

11. An image forming method comprising applying the inks of the ink set of claim 1 onto a recording medium, the recording medium comprising an aggregation accelerator that coagulates components of the inks.

12. The image forming method of claim 11, further comprising thermally fixing an image formed of the inks applied onto the recording medium.

* * * * *